United States Patent
Morihira et al.

[11] Patent Number: 6,033,102
[45] Date of Patent: Mar. 7, 2000

[54] METHOD AND SYSTEM FOR CONTROLLING MIXING OF RAW MATERIALS FOR CEMENT

[75] Inventors: Naoki Morihira; Kazuhiro Tsukuda, both of Hiroshima, Japan

[73] Assignee: Mitsubishi Heavy Industries, Ltd., Tokyo, Japan

[21] Appl. No.: 09/176,212

[22] Filed: Oct. 21, 1998

[30] Foreign Application Priority Data

Oct. 22, 1997 [JP] Japan ................................. 9-289474

[51] Int. Cl.[7] ........................................................ B28C 7/04
[52] U.S. Cl. ................................................. 366/8; 366/17
[58] Field of Search .................................. 366/2, 6, 8, 16, 366/17, 140, 152.1; 700/28; 106/743

[56] References Cited

U.S. PATENT DOCUMENTS

| | | | |
|---|---|---|---|
| 3,783,252 | 1/1974 | Putnam | 700/112 |
| 4,151,588 | 4/1979 | Hammer | 700/35 |
| 4,395,290 | 7/1983 | Oller et al. | 106/746 |
| 5,027,267 | 6/1991 | Pitts et al. | 366/17 |
| 5,320,425 | 6/1994 | Stephenson et al. | 366/2 |
| 5,441,340 | 8/1995 | Cedillo et al. | 366/17 |
| 5,452,213 | 9/1995 | Ito et al. | 366/8 |
| 5,754,423 | 5/1998 | Teutenberg et al. | 364/148 |
| 5,798,917 | 8/1998 | Werbrouck | 700/117 |

*Primary Examiner*—Tony Soohoo

[57] ABSTRACT

A method and a system for controlling the mixing of raw materials for cement. Component contents of a sample material is obtained at an exit side of a mill system to obtain measured modulus values of hydraulic modulus HM, silica modulus SM, and iron modulus IM of a raw material mixture. Estimated modulus values of the component contents is determined and based on current takeout amounts of the raw materials, a mill system passage characteristic model, a component analyzer passage characteristic model, and preset component contents of the raw materials. Modulus deviation values are calculated based on differences between the estimated modulus values and the measured modulus values, and is passed through a noise removal filter. Future modulus values of the component contents are then calculated based on the raw material takeout amounts, and the preset raw material component contents. To determine predicted modulus values for calculation of updated takeout amounts. The predicted modulus values are adjusted to follow predetermined target values while considering a balance among the modulus values of HM, SM and IM, as well as the capacities of feeders of the raw materials, to calculate the updated raw material takeout amounts.

10 Claims, 5 Drawing Sheets

1,2 Holding hopper
3,4 Feed ware
5 Belt conveyor
6 Pulverizing mill
7 Bucket elevator
8 Separator
9 Component analyzer
10 Computer
11,12 Takeout amount detector

| | | | |
|---|---|---|---|
| 1,2 | Holding hopper | 8 | Separator |
| 3,4 | Feed ware | 9 | Component analyzer |
| 5 | Belt conveyor | 10 | Computer |
| 6 | Pulverizing mill | 11,12 | Takeout amount detector |
| 7 | Bucket elevator | | |

METHOD AND SYSTEM FOR CONTROLLING MIXING OF RAW MATERIALS FOR CEMENT

BACKGROUND OF THE INVENTION

1. Field of the Invention

The present invention relates to an automatic control method and an automatic control system for optimum mixing of raw materials for cement.

2. Description of the Related Art

A raw material mixing control system of a cement production plant has a structure, for example, as shown in FIG. 4. In FIG. 4, the reference numerals 1, 2 represent holding hoppers for holding different kinds of raw materials for cement. As shown in FIG. 4, raw materials for cement are taken out of the holding hoppers 1, 2, in predetermined amounts at a time, by feed wares 3, 4, mixed together, and guided by a belt conveyor 5 to a raw material pulverizing mill 6, where they are pulverized.

The raw materials pulverized by the raw material pulverizing mill 6 are guided to a separator 8 via a bucket elevator 7. In the separator 8, the raw material mixture is classified, and the resulting coarse powder is sent again to the raw material pulverizing mill 6. The raw material mixture deprived of the coarse powder is guided to a blending silo (not shown) via a component analyzer 9.

Data on the proportions of the constituents ($CaO$, $SiO_2$, $Al_2O_3$, $Fe_2O_3$) of the raw material mixture fed to the component analyzer 9 are supplied to a computer 10. The computer 10 records the takeout amounts of the respective raw materials that have been detected with takeout amount detectors 11, 12 provided in the feed wares 3, 4.

A functional block diagram of conventional control of mixing is given as FIG. 5.

In FIG. 5, deviations are calculated between targeted modulus values 13 of modulus parameters, and their measured modulus values 15 calculated from the measurements made by the component analyzer 9. The modulus parameters include a hydraulic modulus HM, a silica modulus SM, and an iron modulus IM. These moduli are defined as follows:

$$HM = (CaO)/(SiO_2 + Al_2O_3 + Fe_2O_3) \qquad (1)$$

$$SM = (SiO_2)/(Al_2O_3 + Fe_2O_3) \qquad (2)$$

$$IM = (Al_2O_3)/(Fe_2O_3) \qquad (3)$$

When the above deviations amount to certain values or more, estimates of the component contents of raw materials, to be used in the calculation of a mixture ratio, are made, as designated by 16, on the basis of measured component contents 19 of raw materials for calculation of a mixture ratio. In view of the results, the raw material component contents to be used in calculation of a mixture ratio are updated.

Raw material component content estimated values 20 obtained by these calculations, and deviations 21 between the measured values and the target values of the above-described modulus parameters are used to solve simultaneous equations 17 composed of the equations for the proportions of components (the equations defining the modulus parameters), and equations for material balances. The takeout amounts of the raw materials for bringing the measured values of the modulus parameters into agreement with their target values are calculated thereby. This outcome is put out to the feed wares 3, 4.

Earlier technologies posed the following problems: First, the estimated values 20 of the components of raw materials to be mixed can deviate from the actual values, resulting in the wrong calculated takeout amounts. Secondly, if the measurements of the mixed raw materials made by the component analyzer vary greatly, the simultaneous equations 17 including the equations for the proportions of components, and the equations for material balances may fail to give a solution which satisfies the capacities of the feed wares 3, 4. Among such cases is the possibility that the estimated values 20 of the contents of the components of the raw materials will be negative.

If the number of the raw materials coincides with the number of the simultaneous equations, a solution usually exists. Especially when variations in the chemical compositions of the raw materials are small, the solutions to the simultaneous equations become solutions falling within the scope of the capacities of the feed wares.

When variations in the chemical compositions of the raw materials are large, namely, when the component of some of the raw materials greatly varies, however, the solutions to the simultaneous equations fail to lie within the scope of the capacities of the feed wares. Even in this case, control of raw material mixing should not be discontinued. Thus, in such a case, mixing of the raw materials has been performed by activating an alarm by the computer, switching the setting of the raw material supply amounts from an automatic mode to a manual mode, and relying on a human judgment thereafter. Such control of mixing by human judgment generally creates the problem that differences from an individual to another individual show up markedly.

If the number of the supplied raw materials is greater or smaller than the number of the simultaneous equations, solutions to the simultaneous equations maybe infinite in number or none. Under this situation, no methods are established for solving the simultaneous equations, so that there is no choice other than to rely on a manual operation. Even if the control is performed using the computer, the only feasible manner of control has been such that the hydraulic modulus HM alone is controlled, without simultaneous consideration of all three modulus parameters (HM, silica modulus SM, and iron modulus IM).

SUMMARY OF THE INVENTION

The present invention has been accomplished in an attempt to solve the above-described problems.

According to a first aspect of the present invention, there is provided a method for controlling the mixing of raw materials for cement, comprising the steps of:

measuring the component contents of a sample material obtained at an exit side of a mill system, in which raw materials for cement are mixed, thereby to give measured modulus values of modulus parameters (i.e., hydraulic modulus HM, silica modulus SM, and iron modulus IM) of a raw material mixture;

determining estimated modulus values of the component contents at the mill system exit side during sampling based on takeout amounts of the raw materials, a mill system passage characteristic model, a raw material component content measuring instrument passage characteristic model, and preset component contents of the raw materials to be mixed;

calculating modulus deviation values based on differences between the estimated modulus values and the measured modulus values;

adding values, obtained by passing the modulus deviation values through a noise removal filter, to future modulus values of the component contents at the mill system exit side calculated based on the current takeout amounts of the raw materials and the preset component contents of the raw materials to be mixed, thereby to determine predicted modulus values for calculation of updated takeout amounts; and adjusting the predicted modulus values to follow predetermined target values while considering a balance among the modulus values of the plurality of modulus parameters, as well as the capacities of feeders of the raw materials to be mixed, thereby to calculate the updated takeout amounts of the raw materials.

According to a second aspect of the present invention, there is provided the method for controlling the mixing of raw materials for cement according to the first aspect, in which adjustment for bringing the values of the various modulus parameters into agreement with their target values, and adjustment for suppressing sudden changes in the feed wares are performed online.

According to a third aspect of the present invention, there is provided a system for controlling the mixing of raw materials for cement, comprising:

a measuring unit which measures component contents of a sample material obtained at an exit side of a mill system, in which raw materials for cement are mixed, to obtain measured modulus values of modulus parameters (i.e., hydraulic modulus HM, silica modulus SM, and iron modulus IM) of a raw material mixture;

a determining unit which determines estimated modulus values of the component contents at the mill system exit side based on current takeout amounts of the raw materials, a mill system passage characteristic model, a raw material component content measuring instrument passage characteristic model, and preset component contents of the raw materials to be mixed;

a calculating unit which calculates modulus deviation values based on differences between the estimated modulus values and the measured modulus values;

an adding unit which adds values, obtained by passing the modulus deviation values through a noise removal filter, to future modulus values of the component contents at the mill system exit side calculated based on the current takeout amounts of the raw materials and the preset component contents of the raw materials to be mixed, to determine predicted modulus values for calculation of updated takeout amounts; and a control unit which calculates the updated takeout amounts of the raw materials based on information from the measuring unit, the determining unit, the calculating unit, and the adding unit, wherein the control unit adjusts the predicted modulus values to follow predetermined target values while considering a balance among the modulus values of the plurality of modulus parameters and the capacities of feeders of the raw materials to be mixed, to calculate the updated takeout amounts of the raw materials.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

PREFERRED EMBODIMENTS OF THE INVENTION

An embodiment of the present invention will now be described in detail, but it should be understood that the invention is not restricted thereby.

Figure 1:
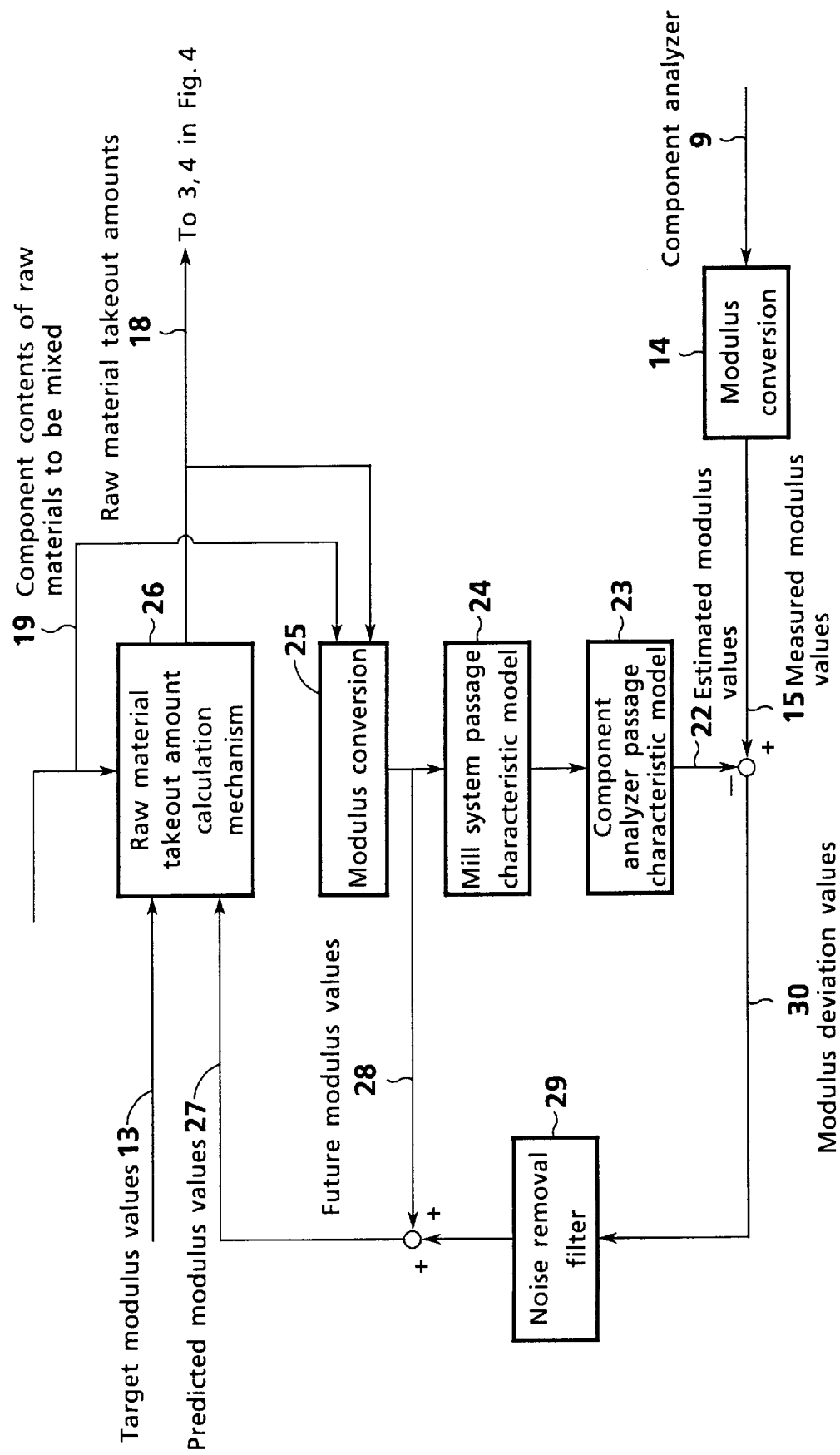
FIG. 1 is a functional block diagram of a mixing control by the present invention.

FIG. 1 is a functional block diagram of a mixing control according to the instant embodiment of the present invention.

As shown in FIG. 1, a method for controlling the mixing of raw materials for cement in accordance with this embodiment comprises the steps of:

(1) measuring the component contents of a sample material obtained at an exit side of a mill system, in which the raw materials are mixed, thereby to give measured modulus values (15) of modulus parameters, i.e., hydraulic modulus HM, silica modulus SM, and iron modulus IM, of a raw material mixture;

(2) determining estimated modulus values (22) of the raw materials on the mill system exit side during sampling based on current takeout amounts (18) of the raw materials, a mill system passage characteristic model (24), a component analyzer passage characteristic model (23), and preset component contents of the raw materials to be mixed;

(3) calculating modulus deviation values (30) from differences between the estimated modulus values (22) and the measured modulus values (15);

(4) adding values, obtained by passing the modulus deviation values (30) through a noise removal filter (29), to future modulus values (28) on the mill system exit side calculated from the current takeout amounts (18) of the raw materials and the preset component contents of the raw materials to be mixed, thereby to determine predicted modulus values (27) to be used in the calculation of updated takeout amounts (18); and (5) adjusting the predicted modulus values (27) to follow predetermined target values (13) while considering a balance among the modulus values of the plurality of modulus parameters, as well as the capacities of feeders of the raw materials to be mixed, thereby to calculate the updated takeout amounts (18) of the raw materials.

The foregoing processings are constituted by the following five steps:

Step ①

The first step of measuring the component contents of a sample material obtained at an exit side of a mill system, in which the raw materials are mixed, thereby to obtain measured modulus values (15) of modulus parameters, i.e., hydraulic modulus HM, silica modulus SM, and iron modulus IM, of a raw material mixture.

Step ②

The second step of determining estimated modulus values (22) on the mill system exit side during sampling based on the current takeout amounts (18) of the raw materials, a mill system passage characteristic model (24), a component analyzer passage characteristic model (23), and preset component contents of the raw materials to be mixed.

Step ③

The third step of calculating modulus deviation values (30) from differences between the estimated modulus values (22) and the measured modulus values (15).

Step ④

The fourth step of adding values, obtained by passing the modulus deviation values (30) through a noise removal filter (29), to future modulus values (28) on the mill system exit side calculated from the current takeout amounts (18) of the raw materials, and the preset component contents of the raw materials to be mixed, thereby to determine predicted modulus values (27) to be used in the calculation of updated takeout amounts (18).

Step ⑤

The fifth step of calculating the updated takeout amounts (18) of the raw materials by a raw material takeout amount calculation mechanism (26), i.e., a control unit for calculating the updated takeout amounts of the raw materials based on the information offered by the above-mentioned first to fourth steps, by which to adjust the predicted modulus values (27) to follow predetermined target modulus values (13) while considering a balance among the modulus values of the plurality of modulus parameters, as well as the capacities of feeders of the raw materials to be mixed.

Details of the instant embodiment will be described by reference to FIG. 1, which is related to the interior of the computer 10 explained in the aforementioned FIG. 4.

Figure 4:
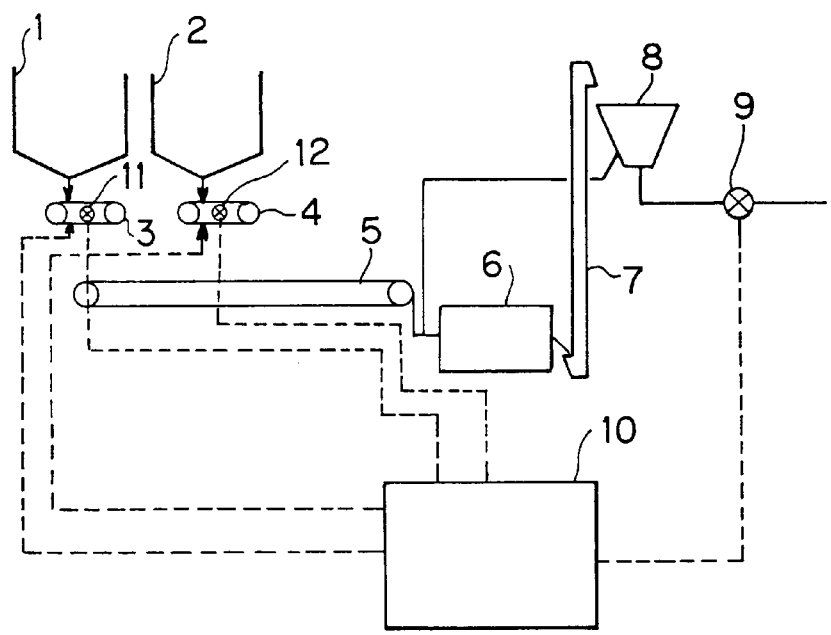
FIG. 4 is a constitution view of a raw material mixing control system of a cement production plant.
Figure 5:
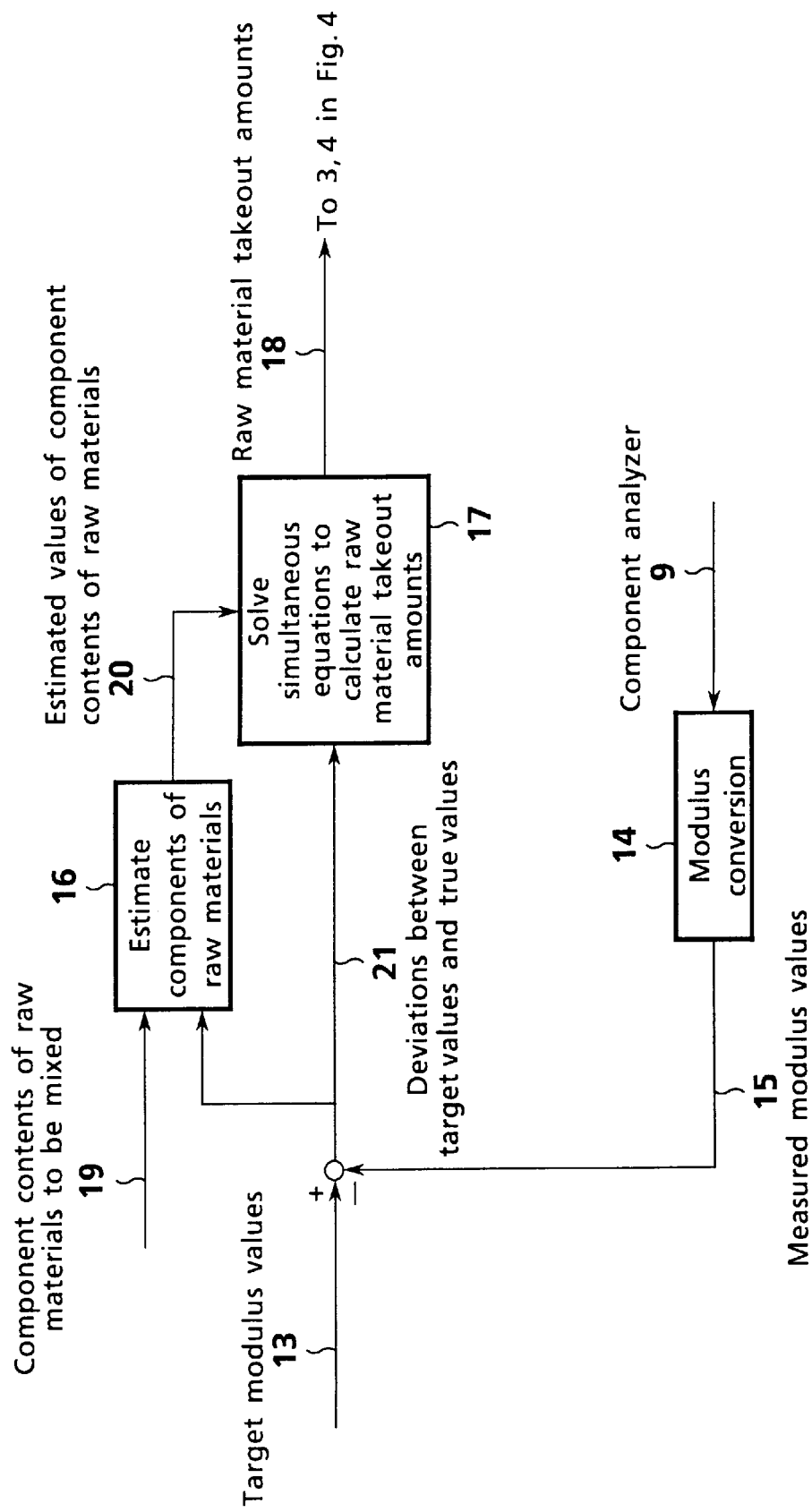
FIG. 5 is a functional block diagram of a conventional mixing control.

As shown in FIGS. 1 and 4, the component contents of a sample material obtained on an exit side of a mill system, for the mixing of raw materials for cement, are measured with the component analyzer 9, thereby to obtain measured modulus values 15 of modulus parameters, i.e., hydraulic modulus HM, silica modulus SM, and iron modulus IM, of a raw material mixture.

Based on the current raw material takeout amounts 18, and the component contents 19 of raw materials to be mixed, the future modulus values 28 are calculated by using the component contents present when mixing in these current takeout amounts. Based on these future modulus values 28, the estimated modulus values 22, on the mill system exit side during sampling, are calculated via the mill system passage characteristic model 24, and the component analyzer passage characteristic model 23.

The mill system passage characteristic model 24 refers to the change characteristics over time (dynamic characteristics) of "the amounts" of the raw materials which have been fed by the feed wares 3, 4, the amounts passing through the raw material pulverizing mill 6. To express the dynamic characteristics of the amounts passing through the mill system, the (dead time)+(primary delay) type, for example, can be employed. The flow rate of the raw materials on the mill system exit side, ($Y_1(t)$), can be obtained from the following equation:

$$Y_1(t) = \{1 - \exp(-(t-L_1)/T\}u_1(t-L_1)$$

where $Y_1(t)$ is the flow rate (tons/hour) of the raw materials on the mill system exit side, $u_1(t)$ is the flow rate (tons/hour) of the raw materials on the mill system entry side, $L_1$ is the dead time (the dwell time in the mill system), and T is the time(hour) constant.

The component analyzer passage characteristic model 23 refers to the time required for analysis by the component analyzer 9. The flow rate of the raw materials on the component analyzer exit side, ($Y_2(t)$), can be obtained from the following equation:

$$Y_2(t) = u_2(t-L_2)$$

where $Y_2(t)$ is the flow rate (tons/hour) of the raw materials on the component analyzer exit side, $u_2(t)$ is the flow rate (tons/hour) of the raw materials on the component analyzer entry side, and $L_2$ is the time(hour) required for analysis.

To calculate the estimated value, a time lag parameter is incorporated into the equation as shown above, to bring the estimated value into agreement with the measured value.

In calculating the updated raw material takeout amounts, attention is paid to any of the modulus parameters whose predicted modulus value 27 has the largest deviation from the corresponding target modulus value 13. The updated raw material takeout amounts are calculated to minimize this deviation. To calculate such predicted modulus values 27, the future modulus values 28 are not used as they are. Instead, modulus deviation values 30 are determined from differences between the estimated modulus values 22 and the measured modulus values 15. These modulus deviation values 30 are passed through the noise removal filter 29 to obtain values, which are added to the future modulus values 28 to determine the predicted modulus values 27.

With the raw material takeout amount calculation mechanism 26, optimum updated raw material takeout amounts 18 are calculated within the range of the capacities of the feed wares 3, 4 so that the predicted modulus values 27 will become as close to the target modulus values 13 as possible, and sudden changes in the updated raw material takeout amounts will be suppressed. This calculation is performed in the following manner:

An updated raw material takeout amount $f_i$ is calculated by applying mathematical programming so that of the elements shown in the following formula (1):

$$\begin{Bmatrix} w_{HM} \cdot |HM - \overline{HM}| \\ w_{SM} \cdot |SM - \overline{SM}| \\ w_{IM} \cdot |IM - \overline{IM}| \\ w_1 \cdot |f_1(t) - f_1(t-1)| \\ w_2 \cdot |f_2(t) - f_2(t-1)| \\ \vdots \\ w_n \cdot |f_n(t) - f_n(t-1)| \end{Bmatrix} \quad (1)$$

the largest element will be minimized within a range defined by:

$$F = \left\{ f_i \mid f_{i\min} \leq f_i \leq f_{i\max}, \sum_{i=1}^{n} f_i = f_t \right\}$$

where,

HM: target value of hydraulic modulus HM,

SM: target value of silica modulus SM,

IM: target value of iron modulus IM,

HM: measured value of hydraulic modulus HM,

SM: measured value of silica modulus SM,

IM: measured value of iron modulus IM, n: number of raw materials fed, $f_i$: takeout amount (t/h) by feed ware i, $f_t$: feed amount of raw material (t/h) fed to raw material pulverizing mill, $f_{imin}$: minimum takeout amount (t/h) that can be fed by feed ware i, $f_{imax}$: maximum takeout amount (t/h) that can be fed by feed ware i, and $w_{HM}, w_{SM}, w_{IM}, w_1, w_2, \ldots, w_n$: weight adjusting parameters.

This means that the takeout amounts which minimize the modulus parameter showing the largest deviation from its target value are calculated within the range of the capacities of the feed wares while suppressing sudden changes in the updated takeout amounts.

In the formula (1), if the follow-up properties on the hydraulic modulus HM are emphasized compared with the other modulus parameters, a large value may be imparted to $w_{HM}$.

Figure 2:
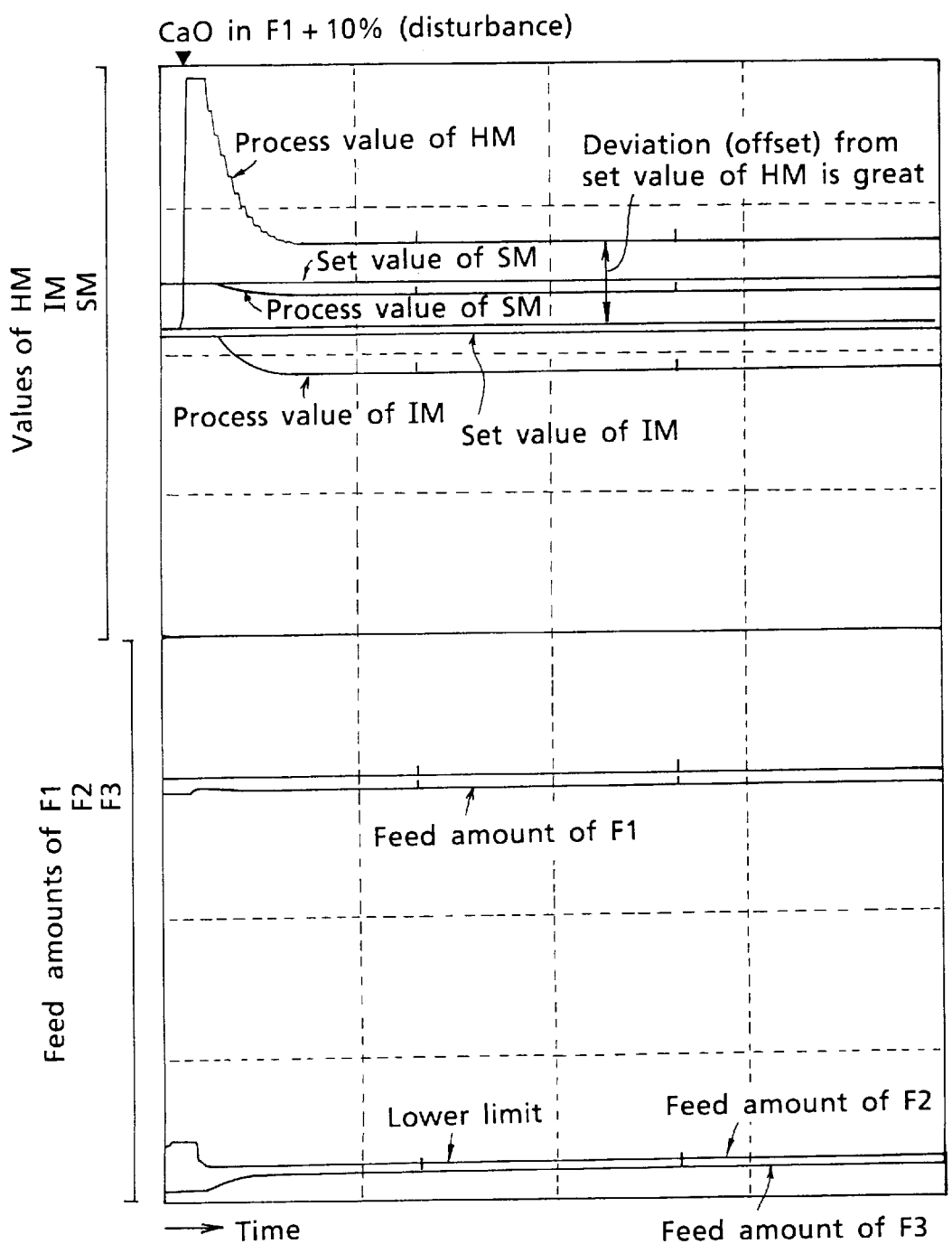
FIG. 2 is a view showing the results of the mixing control by the present invention (Part 1)
Figure 3:
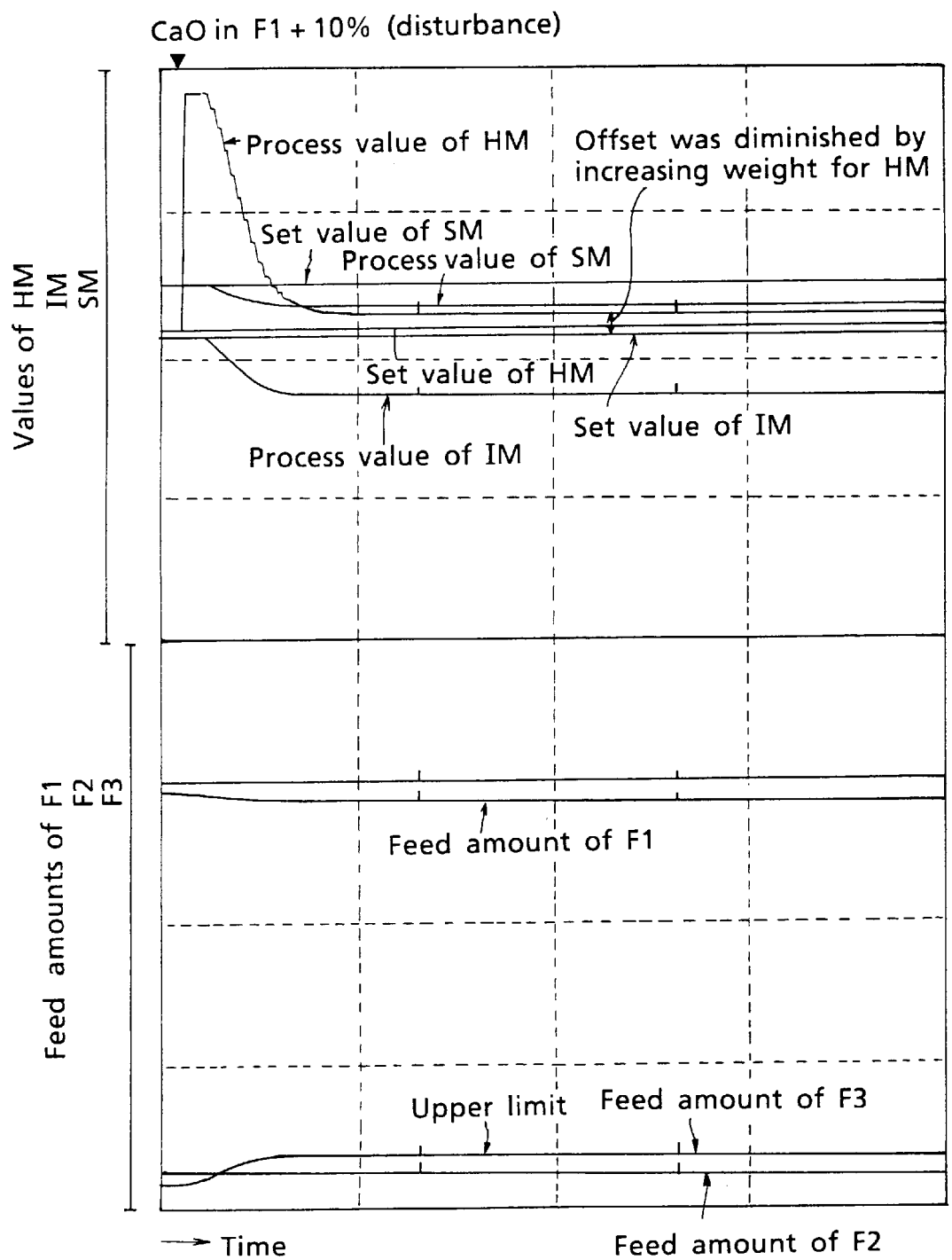
FIG. 3 is a view showing the results of the mixing control by the present invention (Part 2)

The results of calculation based on this method are shown in FIGS. 2 and 3, in which the number of the raw materials supplied (i.e., the number of the feed wares) is three (3).

The component contents of the respective supplied raw materials are shown in Table 1.

TABLE 1

|  |  | F1 | F2 | F3 |
|---|---|---|---|---|
| Chemical | $SiO_2$ | 13.76 | 3.86 | 47.95 |
| composition | $Al_2O_3$ | 3.98 | 1.87 | 12.55 |
| (%) | $TiO_2$ | 0.25 | 0.14 | 0.91 |
|  | $Fe_2O_3$ | 1.87 | 1.05 | 32.58 |
|  | $Mn_2O_3$ | 0.04 | 0.03 | 0.01 |
|  | CaO | 41.67 | 49.45 | 0.6 |

In the above table, F1 was used as a basic material, F2 as a main adjusting supply source of CaO, and F3 as a main adjusting supply source of $Fe_2O_3$. FIGS. 2 and 3 show the results of performance calculation obtained when the CaO in the supplied raw material F1 is deviated by (i.e., had a disturbance of) +10% from the raw material component content used in the calculation of a mixture ratio.

FIG. 2 shows the results of calculation performed for an example in which the amount of F2 was adjusted to reduce the CaO content. This example represents an operating method with emphasis on IM and SM. In this case, the feed amount of F2, the adjusting supply source of CaO, is at its lower limit, so that the HM cannot be lowered any longer. If the amount of F1 is decreased further and the amount of F3 increased, the hydraulic modulus HM can be decreased more. In this case, however, deviation of the value of SM from its set value will increase. It can be seen from FIG. 2 that F1, F2, and F3 are calculated as appropriate takeout amounts of the raw materials (when the iron modulus IM and the silica modulus SM are emphasized) among the three modulus parameters HM, SM and IM.

Conversely, if it is attempted to increase follow-up properties on the set value of the hydraulic modulus HM in an operation focusing on HM, it is recommendable to apply a larger weighting factor to HM.

FIG. 3 shows the results obtained when the weight of HM was increased. One can make sure that HM can be adjusted to follow up its set value better than in FIG. 2. However, deviation (offset) of the iron modulus IM from its set value increases.

These findings demonstrate that the optimum takeout amounts close to the target values have been calculated upon consideration of the limits of the capacities of the feed wares.

The foregoing embodiment has been described in connection with the three materials. However, it goes without saying that the present invention is not restricted thereto, but may be applied to two, four, five or more materials.

As described above, the present invention measures the component contents of a sample material obtained on an exit side of a mill system, in which raw materials for cement are mixed, thereby to obtain measured modulus values of modulus parameters, i.e., hydraulic modulus HM, silica modulus SM, and iron modulus IM, of a raw material mixture; determines estimated modulus values on the mill system exit side during sampling from current takeout amounts of the raw materials, a mill system passage characteristic model, a raw material component content measuring instrument passage characteristic model, and preset component contents of the raw materials to be mixed; calculates modulus deviation values from differences between the estimated modulus values and the measured modulus values; adds values, obtained by passing the modulus deviation values through a noise removal filter, to future modulus values on the mill system exit side calculated from the current takeout amounts of the raw materials, and the preset component contents of the raw materials to be mixed, thereby to determine predicted modulus values for use in the calculation of updated takeout amounts; and adjusts the predicted modulus values to follow predetermined target values while considering a balance among the modulus values of the plurality of modulus parameters, as well as the capacities of feeders of the raw materials to be mixed, thereby to calculate the updated takeout amounts of the raw materials.

If the estimated values of the components of the raw materials to be mixed deviate from the actual values, therefore, these deviations are taken as deviations between the measured modulus values and the estimated modulus values. These deviations (modulus deviation values) are reflected in the correction of the future modulus values calculated on the basis of the estimated values of the components of the raw materials to be mixed. By this measure, the deviations can be resolved.

In calculating the updated takeout amounts, the subjects are formulated with the capacities of the feed wares being considered as positive. Under these conditions, formulae for solving mathematical programming problems are employed. Consequently, even when the compositions of the raw materials vary greatly, namely, when certain components of the raw materials vary greatly, it becomes possible to calculate the updated takeout amounts falling within the range of the capacities of the feed wares. This makes it possible to obtain solutions (raw material takeout amounts) satisfying the formulated conditions, even when the number of the raw materials supplied is larger or smaller than the number of the aforementioned simultaneous equations.

In calculating the updated takeout amounts, the weight adjusting parameter of a large value is applied to any of the modulus parameters (hydraulic modulus HM, silica modulus SM, iron modulus IM) whose agreement with the corresponding target value is to be emphasized. This makes an intuitive adjustment possible. If abrupt changes in the updated raw material takeout amounts are to be avoided, large values are set for the weight adjusting parameters on the feed wares, whereby such abrupt changes can be avoided.

In the method for controlling the mixing of raw materials for cement, adjustment for bringing the values of the various modulus parameters into agreement with their target values, and adjustment for suppressing sudden changes in the feed wares are performed online. Thus, even if a disturbance occurs, prompt action in the mixing of raw materials for cement can be taken.

This invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for controlling the mixing of raw materials for cement, comprising:

measuring the component contents of a sample material obtained at an exit side of a mill system, in which raw materials for cement are mixed, to obtain measured modulus values of modulus parameters of a raw material mixture;

determining estimated modulus values of the component contents at the mill system exit side based on current takeout amounts of the raw materials, a mill system passage characteristic model, a raw material component content measuring instrument passage characteristic model, and preset component contents of the raw materials to be mixed;

calculating modulus deviation values based on differences between the estimated modulus values and the measured modulus values;

adding values, obtained by passing the modulus deviation values through a noise removal filter, to future modulus values of the component contents at the mill system exit side calculated based on the current takeout amounts of the raw materials and the preset component contents of the raw materials to be mixed to determine predicted modulus values for calculation of updated takeout amounts; and adjusting the predicted modulus values to follow predetermined target values while considering a balance among the modulus values of the plurality of modulus parameters and the capacities of feeders of the raw materials to be mixed, to calculate the updated takeout amounts of the raw materials.

2. The method of claim 1, wherein adjustment for bringing the values of the various modulus parameters into agreement with their target values, and adjustment for suppressing sudden changes in the feed wares are performed online.

3. The method of claim 1, wherein said modulus parameters include at least one of hydraulic modulus, silica modulus, and iron modulus.

4. A system for controlling the mixing of raw materials for cement, comprising:

a measuring unit which measures component contents of a sample material obtained at an exit side of a mill system, in which raw materials for cement are mixed, to obtain measured modulus values of modulus parameters of a raw material mixture;

a determining unit which determines estimated modulus values of the component contents at the mill system exit side based on current takeout amounts of the raw materials, a mill system passage characteristic model, a raw material component content measuring instrument passage characteristic model, and preset component contents of the raw materials to be mixed;

a calculating unit which calculates modulus deviation values based on differences between the estimated modulus values and the measured modulus values;

an adding unit which adds values, obtained by passing the modulus deviation values through a noise removal filter, to future modulus values of the component contents at the mill system exit side calculated based on the current takeout amounts of the raw materials and the preset component contents of the raw materials to be mixed, to determine predicted modulus values for calculation of updated takeout amounts; and a control unit which calculates the updated takeout amounts of the raw materials based on information from the measuring unit, the determining unit, the calculating unit, and the adding unit, wherein said control unit adjusts the predicted modulus values to follow predetermined target values while considering a balance among the modulus values of the plurality of modulus parameters and the capacities of feeders of the raw materials to be mixed, to calculate the updated takeout amounts of the raw materials.

5. The system of claim 4, wherein said modulus parameters include at least one of hydraulic modulus, silica modulus, and iron modulus.

6. A method for updating takeout amounts of raw materials for cement, comprising:

measuring actual modulus values of component contents in a mixture of the raw materials;

determining estimated modulus values of the component contents based on current takeout amounts of the raw materials;

calculating modulus deviation values based on said measured actual modulus values and said determined estimated modulus values;

calculating future modulus values based on said current takeout amounts of the raw materials and predetermined component contents of the raw materials to be mixed;

calculating predicted modulus values based on said calculated modulus deviation values and said calculated future modulus values; and updating takeout amounts of the raw materials based on said predicted modulus values and predetermined target modulus values such that said predicted modulus values coincide with said predetermined target modulus values.

7. The method of claim 6, wherein said measured modulus values include at least one of hydraulic modulus, silica modulus, and iron modulus.

8. The method of claim 6, further comprising:

removing noise from said calculated modulus deviation values prior to calculation of said predicted modulus values.

9. The method of claim 6, wherein said determining step includes the step of determining said estimated modulus values based on said predetermined component contents of the raw materials to be mixed and a mill system passage characteristic model.

10. The method of claim 6, further comprising:

constantly updating said takeout amounts by the updated takeout amounts, as said current takeout amounts, to calculate said estimated modulus values and said future modulus values.

* * * * *